United States Patent Office 2,949,362
Patented Aug. 16, 1960

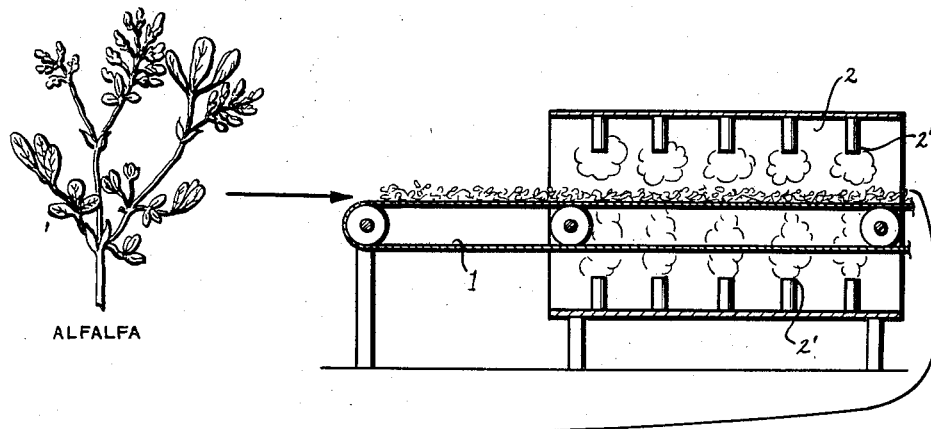
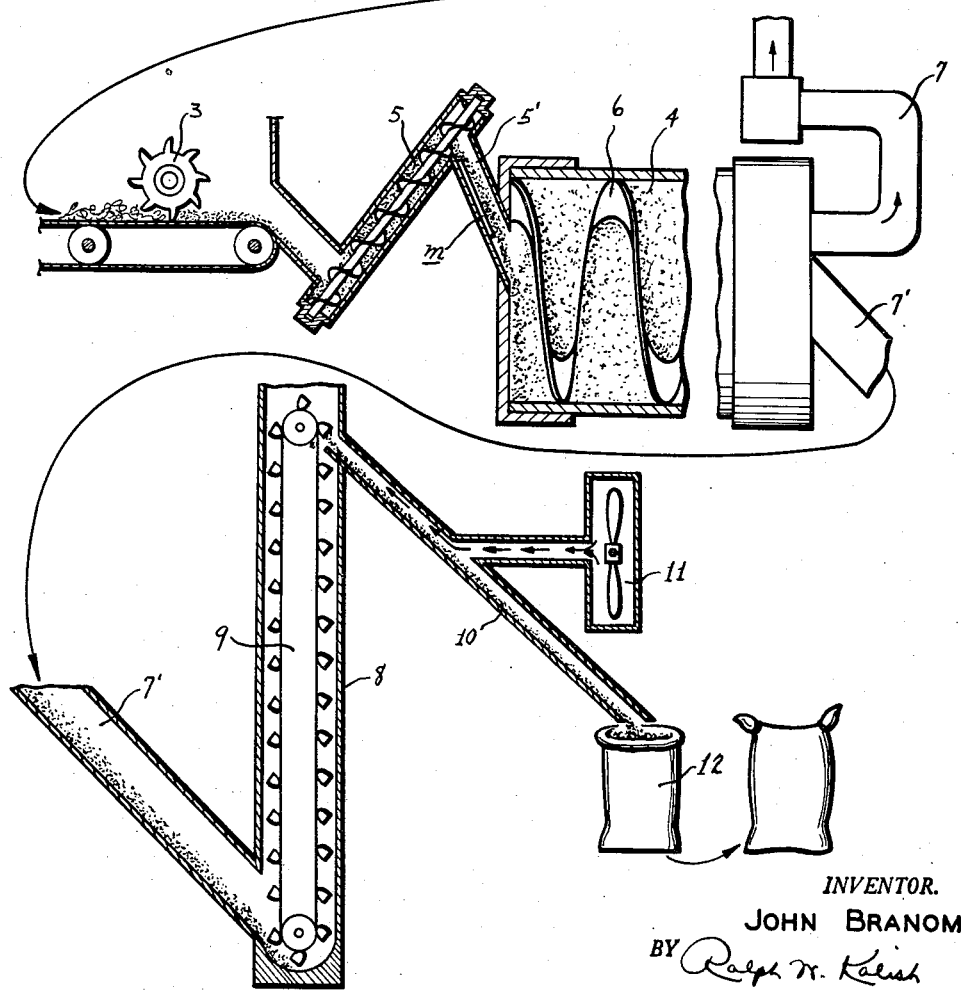

2,949,362

METHOD FOR PRODUCING ANIMAL FEED

John Branom, Wiley, Colo., assignor to Standard Alfalfa Milling Company, Wiley, Colo., a corporation of Colorado Filed Jan. 19, 1959, Ser. No. 787,565

6 Claims. (Cl. 99—8)

This invention relates in general to animal feed and, more particularly, to certain new and useful improvements in a method for producing animal feed.

It is a primary object of the present invention to provide a method for producing a meal for animal feeding purposes, from forage plants, such as alfalfa, and from hay, and the like, which meal is highly palatable and nutritious and may comprise as in the case of alfalfa, discrete leaf sections substantially free of "dust" or fine particles, and having coarseness and bulk for necessary roughage.

It is a further object of the present invention to provide a method for producing a meal for animal feeding purposes having the characteristics stated, which method may be most expeditiously, reliably, and economically performed; which method is amenable to execution in a substantially automatic manner; which method does not require in practice the utilization of costly equipment; and which method does not necessitate the services of highly skilled or trained individuals.

These and other detailed objects are obtained by the structures illustrated in the accompanying drawing (one sheet) in which the single figure presents a composite, pictorial representation, in the nature of a flow diagram, of the various, successive steps in the method for producing alfalfa in accordance with the present invention.

In essence, the present invention comprises, in sequence, sun-curing of a mowed and raked hay, a forage plant, such as alfalfa and the like, subjecting the same to steam for wilting or softening of the cut plant sections so that upon the succeeding step of chopping thereof into meal form, the plant will not disintegrate into a dried dust or powdered form, then removing the moisture from, or drying, the chopped, steamed plant sections, cooling the now-dried material and then packing the meal in bags or like containers.

Although the present invention is applicable to generally hay, forage plants and other sources of fodder for purposes of illustration and exposition only, the description of such method will be restricted to alfalfa, since such plant being leafy will well serve for exemplary purposes. The utilization of the present method produces an alfalfa meal which has proven markedly palatable and most beneficial to cattle, as such feed provides the desired roughage while being substantially "dust-free" and hence, non-irritating to the nasal passages or the digestive track of cattle as the same is composed of intact leaf segments which further assures maximum protein availability. Prior to the present invention it had been common practice immediately upon cutting alfalfa, to dehydrate same by mechanical or artificial means, chop the dehydrated alfalfa, and then pack the resulting dusty meal for feed usage. The chopping strokes caused the dried alfalfa to be reduced to finely divided particles rather than leaf segments. Alfalfa of this nature has proved to be entirely unsatisfactory for cattle feed since most cattle will consistently reject same as its ingestion causes irritation of the nasal membranes, with great sneezing, as well as of organs of the digestive system. Furthermore, and of moment, is the fact that milk production of cows fed on such dehydrated alfalfa is of relatively poor quality and materiallly reduced quantity.

Making reference to the figure, which sets forth diagrammatically the successive steps in the present procedure, alfalfa immediately upon being cut is permitted to be sun-dried or cured as by remaining in the field for a requisite period of time, such as from two to five days, depending upon atmospheric conditions. If the ambient temperature is sufficiently high, the drying may be accomplished within minimum time, of about two days' duration, whereas humidity and temperature conditions may necessitate a longer period to assure proper curing. The cured or dried alfalfa is then steamed for moisture absorption. In order to accomplish this step in the most economical manner, the alfalfa is delivered to a conveyor, as at 1, and transmitted thereby to a steam compartment or chest 2, enclosing a section of conveyor 1. Steam compartment 2 is interiorly provided with a plurality of steam outlets, as indicated at 2', such being both above and below conveyor 1 so that the interior of compartment 2 is entirely steam-filled at all times to assure the absorption of sufficient moisture by the cured alfalfa for softening the leaves thereof, or in other words, to produce wilting. The now steamed, moisture-laden alfalfa, the temperature of which has, understandably, been raised above atmospheric temperature, is then conveyed from steam compartment 2 to a conventional rotary-type chopper 3. Because of its steamed condition, the alfalfa will not, under the forceful strokes of chopper 3, be reduced to powdered or dusty form by such slicing action, but will be merely divided into discrete leaf portions, which may be approximately of the order of ¾ of an inch, constituting the meal.

From chopper 3, the steamed alfalfa meal is transmitted, by suitable means, to a drying unit shown at 4. It is understood that the conveyance of the meal to dryer 4 may be accomplished in any convenient manner, although in utilizing equipment of the type herein described, it has been found expedient to cause same to be elevated from chopper 3, as by an augur-type feed device 5 ultimate gravity flow into one end of dryer 4, as through a chute 5' having a magnetized plate m for removal of any metallic particles from the chopped alfalfa. Said dryer 4 serves to remove the moisture or steam from the meal, which would include the applied steam as well as any such as may have been generated from water originally contained in the alfalfa upon subjection to the elevated temperatures in steam compartment 2. Dryer 4, in the present instance, comprises an elongated, cylindrical drum, adapted for rotation and internally provided with a fixedly mounted spiral or augur 6 for impelling the meal therethrough. Dryer 4 at its opposite end is further provided with an air-exhaust unit, as at 7, for removal of the steam from the alfalfa meal. By traverse through dryer 4, the alfalfa meal is rendered substantially fully dried, although remaining at a relatively high temperature. From dryer 4 the alfalfa meal is directed by a delivery chute 7' to the lower-receiving end of an elevator 8 which may comprise an enclosed shaft-forming structure within which is disposed a vertically arranged, endless belt-type conveyor 9 having spaced bucket-like receptacles for carrying the meal upwardly to the upper end of elevator 8 for discharge into a downwardly directed cooling conduit or pipe 10 which is thin walled and atmospherically surrounded, for gravity-motivated movement therealong. Flowing counter-wise to the direction of movement of the alfalfa meal is a cooling-air currrent, as provided by a suitable blower, schematically shown at 11, which counter current is of such force relative to the gravitational pull of the alfalfa meal as not to impede the even descent of the same and is at such a relatively reduced temperature as to permit heat exchange therebetween, so that upon arrival of the meal at the lower end of cooling conduit 10 the temperature of the meal will have been lowered to substantially atmospheric temperature. From conduit 10 the alfalfa meal is collected for packaging, as in bags, 12, or other related devices.

It is to be recognized that the particular equipment hereinabove described as useful in practicing the present invention is not critical, but is merely set forth for illustrative purposes, as the individual steps in the present procedure may be performed by other comparable and equally efficacious means. However, the present invention does reside in the specific sequential treatment steps accorded the plant material to produce a resulting meal or feed having those dietary properties so requisite for cattle health and attendant high quality and quantity milk production, which properties have not been attained by production methods heretofore known.

Additionally, the conditions existing within steam compartment 2, dryer 4 and cooling conduit 10 are not of prime specificity, since steaming of the alfalfa, hay, and the like need only be to the degree necessary to prevent powder formation on chopping, and this may be easily determined, while the drying and cooling of the meal shall be under such conditions as to restore same to a dried state, having substantially atmospheric temperature.

Thus, this invention encompasses a natural curing of the alfalfa, hay and the like rather than the forced dehydrating thereof, the conditioning of the same by steaming so that upon slicing the development of dust formation is obviated, and then the de-steaming and cooling of the meal with the end product being free of fine particles, consisting, as in the case of alfalfa, of intact leaf sections, and being highly palatable and easily digestable by cattle. As stated above, the present invention is directed to a novel method for producing a nutritious animal feed, and is adaptable for hay, and forage plants, so that the description of this invention with respect to alfalfa is not to be considered exclusive.

It should be understood that changes in the methods, compositions, and combinations set forth may be made without departing from the nature and principle of my invention.

Having thus described my invention, what I claim and desire to secure by Letters Patent is:

1. A method for producing an animal feed comprising mowing plants, drying said mowed plants under atmospheric conditions, subjecting the mowed plants to steam, chopping the steamed plants into discrete particles, and then drying the chopped steamed particles.

2. A method for producing an animal feed comprising mowing forage plants, drying said mowed plants under atmospheric conditions, subjecting the mowed plants to steam for softening thereof and raising the temperature of said plants above that of the atmosphere, chopping the steamed plants into discrete particles, and then drying the chopped steamed particles.

3. A method for producing an animal feed comprising mowing leafy plants, drying said mowed plants under atmospheric conditions, subjecting the mowed plants to steam for softening thereof and raising the temperature of said plants above that of the atmosphere, chopping the steamed plants into discrete leaf sections, then drying the chopped steam leaf sections, and thence subjecting the dried leaf sections to a cooling agent.

4. A method of producing alfalfa meal which comprises mowing and raking alfalfa, drying the mowed alfalfa under atmospheric conditions, subjecting the mowed alfalfa to steam, chopping the steamed alfalfa into discrete sections, and then drying the chopped alfalfa.

5. A method for producing alfalfa meal which comprises mowing and raking alfalfa, drying the mowed alfalfa under atmospheric conditions, subjecting the mowed alfalfa to steam for wilting thereof and for raising the temperature thereof above that of the atmosphere, chopping the alfalfa while the same is in a steamed relatively high temperature state into discrete sections forming a meal, drying the alfalfa meal, and then packing of the same.

6. A method for producing alfalfa meal which comprises moving and raking alfalfa, drying the mowed alfalfa under atmospheric conditions, subjecting the mowed alfalfa to steam for wilting thereof and for raising the temperature thereof above that of the atmosphere, chopping the alfalfa while the same is in a steamed relatively high temperature state into discrete sections forming a meal, removing moisture and applied steam from the alfalfa meal, then cooling the meal, and then packing the same.

References Cited in the file of this patent

UNITED STATES PATENTS

| 1,251,510 | Grosvenor | Jan. 1, 1918 |

FOREIGN PATENTS

| 1,811 | Great Britain | 1862 |